I. Barber.
Cultivator.

Nº 71834      Patented Dec. 3, 1867.

Witnesses.
Robert A. Hews
Thos. Crook

Inventor.
Ira Barber

United States Patent Office.

IRA BARBER, OF LA PORTE, INDIANA.

Letters Patent No. 71,834, dated December 3, 1867.

IMPROVEMENT IN CULTIVATORS.

*The Schedule referred to in these Letters Patent and making part of the same.*

TO ALL WHOM IT MAY CONCERN:

Be it known that I, IRA BARBER, of the city of La Porte, in the county of La Porte, and State of Indiana, have invented a new and useful Improvement in Cultivators; and I do hereby declare that the following is a full, clear, and exact description of the construction and operation of the same, reference being had to the annexed drawings, making a part of this specification, in which—

Figure 2:
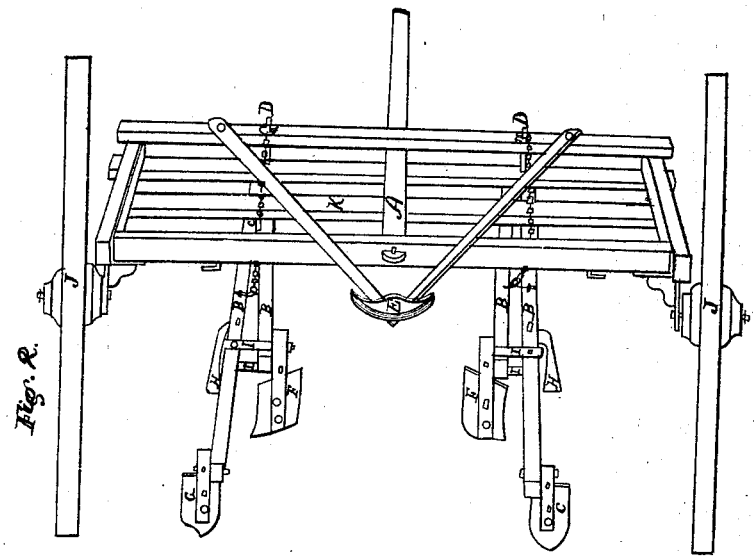
Figure 1:
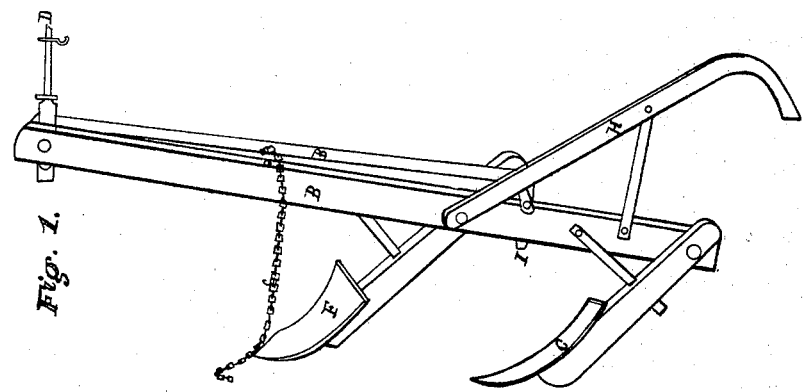

Figure 1 is a view of the entire cultivator.
Figure 2 is a view of section of same.

To enable others skilled in the art to make and use my invention, I will proceed to describe its construction and operation.

A represents the frame, with pole attached; B B represent beams; C represents chain; D represents pivoted flat bar; E represents seat; F represents double-curved shovel; G represents single-curved shovel; H represents the handles; I I represent slotted bar; J represents wheels; and K represents double-trees. The frame A is constructed with pole attached in centre; at the rear of the pole, the double-trees K. On either end is attached an iron rod, to which the horses are attached, on either side of the pole, in such a manner that they travel between the rows of corn, the seat E attached to the frame A in such a manner that the driver, seated thereon, with his feet on the slotted bar I I, together with the handles H, has full control of and guides, with the utmost ease, the shovels F and G. The beams B B are attached, at the upper end, by means of a bolt, to the pivoted flat bar D, and by means of the chain C, attached to the upper end of the pivoted flat bar D and the beams B B, the shovels F and G are elevated or lowered to the proper depth, and, by means of the handles H, the beams B B are elevated to the frame A, and fastened to slide or hook on lower side of rear of frame A, so that, in travelling or turning, the shovels F and G are free from obstacles. By means of the slotted bar I I, the beams are widened or narrowed to any width desired. It also furnishes a stirrup for the foot of the driver.

The pivoted flat bar D is so arranged that the beams B B may be swung either way, and, in swinging either way, they are not elevated above where they are set by the chain C.

The double-curved shovel F, attached to post of beam B B, is so constructed that it may be reversed, so as to throw the dirt in either direction, by loosening the post attaching the double-curved shovel F to beams B B, and transferring the same to the opposite beams B B.

What I claim as my invention, and desire to secure by Letters Patent, is—

The beams B B, the chain C, and the pivoted flat bar D, the double-curved shovel F, and the slotted bar I I, as substantially arranged, connected, and set forth in the annexed and foregoing specification.

IRA BARBER.

Witnesses:
ROBERT A. HEWS,
THOS. F. CROFT.